United States Patent
Mattila (10) Patent No.: US 9,224,243 B2
(45) Date of Patent: Dec. 29, 2015

(54) IMAGE ENHANCEMENT USING A MULTI-DIMENSIONAL MODEL

(71) Applicant: Nokia Corporation, Espoo (FI)

(72) Inventor: Ville-Veikko Mattila, Tampere (FI)

(73) Assignee: Nokia Technologies Oy, Espoo (FI)

( * ) Notice: Subject to any disclaimer, the term of this patent is extended or adjusted under 35 U.S.C. 154(b) by 262 days.

(21) Appl. No.: 13/897,575

(22) Filed: May 20, 2013

(65) Prior Publication Data

US 2014/0340395 A1    Nov. 20, 2014

(51) Int. Cl.
*G06T 17/05* (2011.01)
*H04N 13/02* (2006.01)
*G06T 7/00* (2006.01)
*H04N 13/00* (2006.01)

(52) U.S. Cl.
CPC .............. *G06T 17/05* (2013.01); *G06T 7/0046* (2013.01); *H04N 13/0207* (2013.01); *H04N 13/0221* (2013.01); *H04N 13/0275* (2013.01); *H04N 13/004* (2013.01)

(58) Field of Classification Search
None
See application file for complete search history.

(56) References Cited

U.S. PATENT DOCUMENTS

| | | | |
|---|---|---|---|
| 2005/0111753 A1 | 5/2005 | Peleg et al. | |
| 2012/0274625 A1 | 11/2012 | Lynch | |
| 2012/0300020 A1 | 11/2012 | Arth et al. | |

FOREIGN PATENT DOCUMENTS

| | | |
|---|---|---|
| GB | 2315124 | 1/1998 |
| WO | WO2007111570 | 10/2007 |
| WO | WO2012136388 | 10/2012 |

OTHER PUBLICATIONS

Brian Klug, "A Quick Analysis of EXIF data from Apple's iPhone 4S Camera Samples" http://www.brianklug.org/2011/11/a-quick-analysis-of-exif-data-from-apples-iphone-4s-camera-samples, Nov. 7, 2011.*
Knorr et al., "Stereoscopic 3D from 2D video with super-resolution capability," Elsevier B.V. 2008.*
Cornelis et al., "3D Urban Scene Modeling Integrating Recognition and Reconstruction", Springer, Oct. 2, 2007.*
Snavely et al., "Photo Tourism: Exploring Photo Collections in 3D", ACM, 2006.*
Mostafa et al., "Digital image georeferencing from a multiple camera system by GPS/INS", Elsevier Science, 2001.*
Debevec et al., "Modeling and Rendering Architecture from Photographs: A hybrid geometry- and image-based approach", ACM, 1996.*
Ruigang Yang et al., View-Dependent Textured Splatting, 2006, Center for Visualization and Virtual Environment, Lexington, KY.
Shmuel Peleg et al., Omnistereo: Panoramic Stereo Imaging, Mar. 2001, vol. 23, No. 3, IEEE Transactions on Pattern Analysis and Machine Intelligence.

(Continued)

*Primary Examiner* — Kee M Tung
*Assistant Examiner* — Nicholas R Wilson
(74) *Attorney, Agent, or Firm* — Lempia Summerfield Katz LLC (57) ABSTRACT

A method and apparatus for enhancing an image capture of a geographic area is presented. The enhancement involves determining an estimated pose within a model that is related to an image using orientation and location data associated with the image. An alternate pose within the three dimensional model may be selected based on the estimated pose. A virtual image of the three dimensional model may be generated as a function of the alternate pose. The image and the virtual image may be combined to create a stereoscopic image.

20 Claims, 7 Drawing Sheets

(56) References Cited

OTHER PUBLICATIONS

U.S. Appl. No. 13/897,571, filed May 20, 2013, entitled "Image Enhancement Using a Multi-Dimensional Model".

Chenxi et al., Personal Photograph Enhancement Using Internet Phto Collections, Speil 23, 2013, vol. 20, No. 2, IEEE Transactions on Visualization and Computer Graphics.

European Search Report and Written Opinion cited in EP14163106, mailed Jul. 25, 2014.

Helferty et al., Combined Endoscopic Video Tracking and Virtual 3D CT Registration for Surgical Guidance, Sep. 2002, vol. 2, Internation Conference on Image Processing.

* cited by examiner

IMAGE ENHANCEMENT USING A MULTI-DIMENSIONAL MODEL

FIELD

The following disclosure relates to imaging systems and image display related applications, and more specifically to enhancement of two dimensional images using multi-dimensional or geographic models.

BACKGROUND

Mobile device users may attempt to capture an experience by acquiring two dimensional images of the user's experience. These two dimensional images may be acquired using a user's mobile device camera and may be stored digitally. To review the user's experiences, the user may view the two dimensional images. Other users may also view the images. However, the two dimensional viewing experience is limited to the two dimensional objects and information captured in the image.

SUMMARY

In an embodiment, a method involves receiving a mobile image file comprising image data of a geographic area. The image may also include orientation data and location data. The method may involve determining an estimated pose within a three dimensional model using the orientation data and location data. An alternate pose within the three dimensional model may be selected based on the estimated pose. A virtual image of the three dimensional model as a function of the alternate pose may be generated. The image data and the virtual image may be combined to create a stereoscopic image or a stereo image. The stereoscopic image may provide a view of the area with a three dimensional effect.

In an embodiment an apparatus includes a memory configured to store a mobile image file comprising image data, orientation data, and location data. The memory may also be configured to store a three dimensional model of the geographic area represented by the image data. The apparatus may include a controller configured to determine an estimated pose within the three dimensional model related to the mobile image file using the orientation data and location data. The controller may also be configured to select an alternate pose within the three dimensional model based on the estimated pose and generate a virtual image of the three dimensional model as a function of the alternate pose. The controller may also be configured to combine the image and the virtual image to create a stereo image.

In an embodiment, a non-transitory computer readable medium may include instructions that when executed on a computer are operable to determine an estimated pose within a geographic model that is related to an image using orientation data and location data associated with the image. The instructions may be further operable to select an alternate pose within the three dimensional model based on the estimated pose. The instructions may also be operable to generate a virtual image of the geographic model and combine the image and the virtual image to create a stereoscopic image.

BRIEF DESCRIPTION OF THE DRAWINGS

Exemplary embodiments of the present invention are described herein with reference to the following drawings.

DETAILED DESCRIPTION

A user may create a new image or retrieve an existing image. The image may have associated data or metadata that indicates when the image was taken, where the image was taken, the direction the camera was facing, a tilt angle of the camera, and zoom level of the camera. This data may indicate a camera orientation and location.

An image may then be positioned or aligned in a multi-dimensional world model, such as is used in Nokia's NAVTEQ True™ product, using the image data and/or metadata associated with the image data. A system may use the image data and/or metadata to determine a point in the model correlating to the actual location where the camera was located, and the camera's orientation, when an image was taken, thus establishing a pose of the camera in the multi-dimensional model. The image may be enhanced using information from the aligned multi-dimensional model. The model information used to enhance the image may include a virtual model image of the geographic area represented in the image. Creating the virtual model image at a perspective offset a distance from the established camera pose in the multi-dimensional model may allow a stereo image of the geographic area represented in the image to be created when the original image and the virtual model image are combined.

Figure 1:
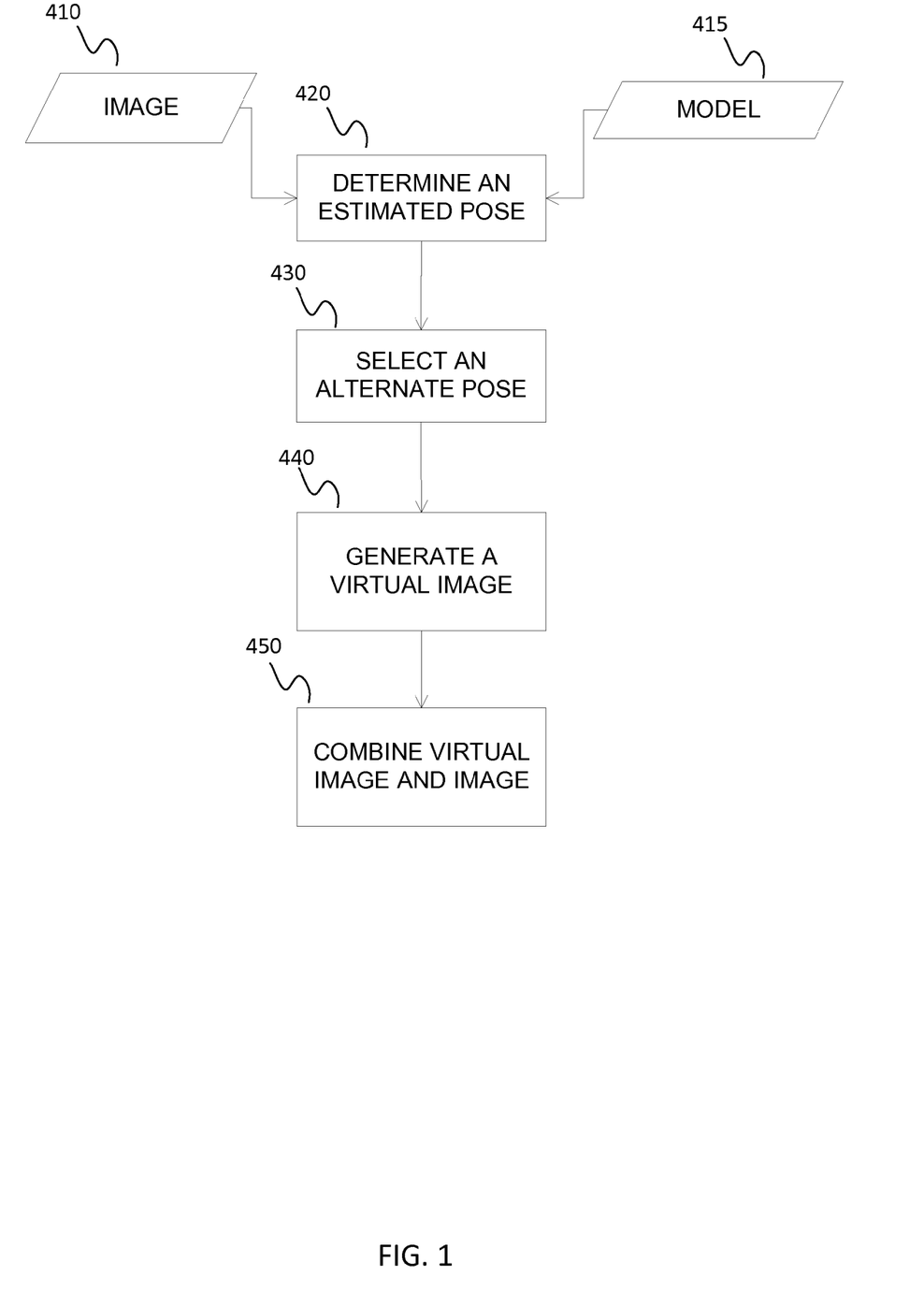
FIG. 1 illustrates an exemplary image enhancement method.

FIG. 1 illustrates an exemplary image enhancement method.

At act 420 an estimated pose within a model 415 related to an image 410 may be determined. In an embodiment, the image may be an image file having orientation data and location data associated with the image file. The associated orientation data may include data indicating the direction the device was facing, as well as other orientation information relating to the device at the time the image was captured. Zoom level data may also be associated with the image file. The location data, orientation data, and zoom level data may be used to determine an estimated pose within the model 415.

The image 410 may be captured using a mobile device operated by a user without an established or standardized orientation. For example, if a mobile device is not stabilized by a stand or bracket assembly that maintains a fixed or known orientation to a geographic area, the actual orientation of the mobile device when an image is acquired may be any of multiple possible orientations. As the orientation may involve multiple possible orientations, the mobile device may record orientation data relating to a casually acquired image to establish a specific orientation for the image. The orientation data may be associated with the image 410. The orientation data may include mobile device tilt, zoom level, view direction, or any other data indicating the orientation of the mobile device at the time the image 410 is captured.

The model 415 may be a three dimensional model. The model may also be a geographic model and represent a geographic area. The geographic area may be a rural town, forest, pasture, city, man-made structure or object, any other type of geographic area, or structure in a geographic area. The model may also be correlated to the actual geographic coordinates of the geographic area represented in the model. The model may contain wire-form models having corner points and forming polygons representing the features and objects in the geographic area. The wire-form models may have images of the geographic area covering the viewable surface of the wire-form models. These images may be aligned to cause the wire-form model to resemble the appearance of the geographic area the model represents. The model 415 may be manipulated to present multiple orientations or views of the model. The model 415 may also be operational to mimic a specific time of day or time of year for the geographic area represented. Artificial shading, lighting, and coloring may be used in the model 415 to further mimic a geographic area represented. In an embodiment, colors of an image 410 may be sampled and applied to a model to further mimic the geographic area of the image 410.

At act 430 an alternate pose within the model 415 may be selected based on an estimated pose determined in act 420. The alternate pose may be offset a distance from the estimated pose. The offset distance may be a distance between the eyes of a user as represented in the model.

At act 440 a virtual image of the model 415 may be generated as a function of the alternate pose selected in act 430. The virtual image may be generated of a geographic area of the image 410 as represented in the model 415.

At act 450 the virtual image generated in act 440 may be combined with the image 410 to create a stereoscopic image. The virtual image and the image 410 may be combined by any known method resulting in stereo image effects. For example, the virtual image and the casually acquired image may be interleaved to create a stereopsis for binocular vision to create the illusion of three dimensional depth from the combined two dimensional images.

In an embodiment, acts 420, 430, 440, and 450 are performed using a mobile device. In another embodiment, a mobile device may also capture the casually acquired image. The casually acquired image may be captured using a mobile application of a mobile device and may also be received from a mobile application of the mobile device.

Figure 2:
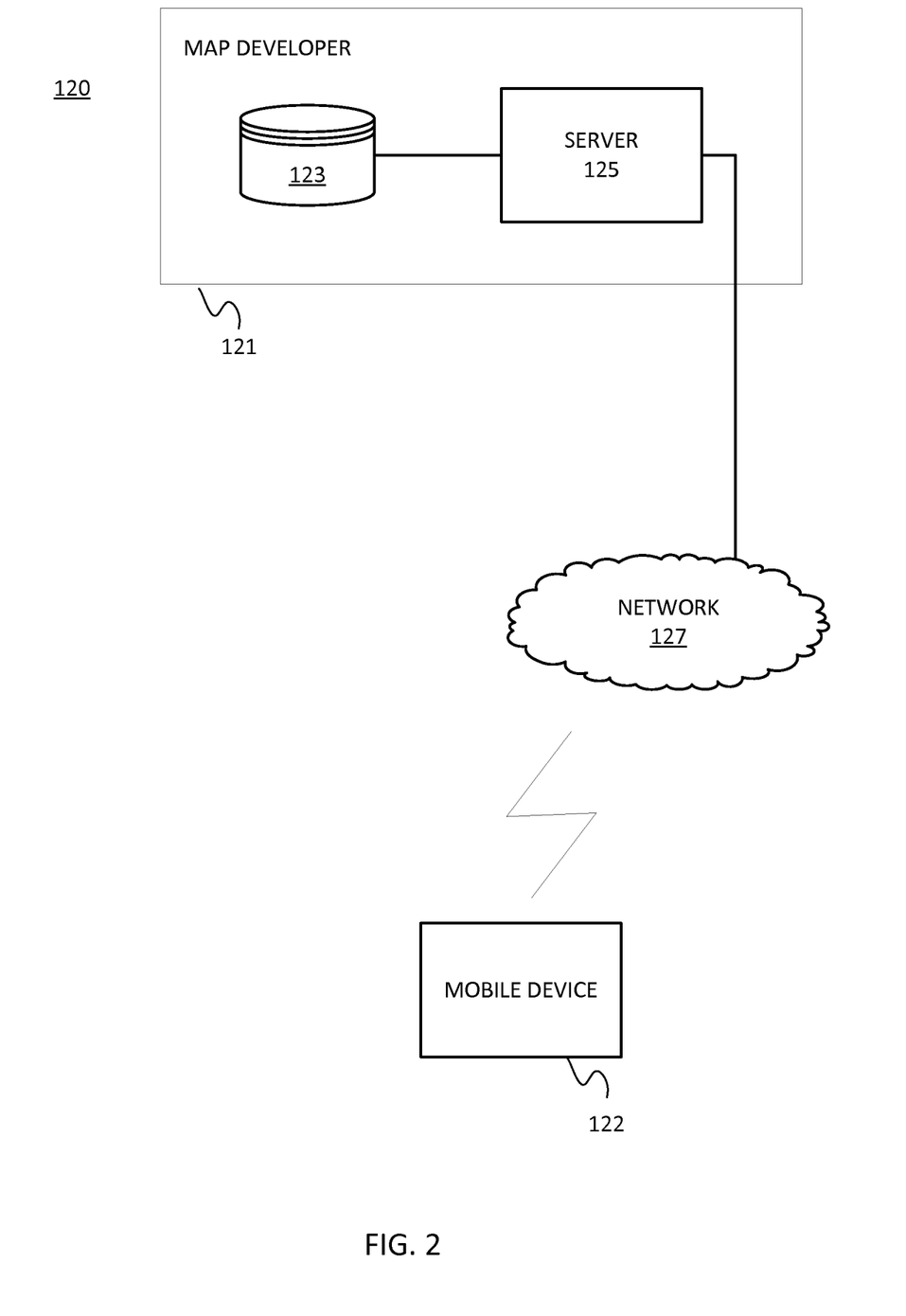
FIG. 2 illustrates an exemplary networked model system for image enhancement.

FIG. 2 illustrates an exemplary networked model and mapping system 120 for image enhancement. The mapping system 120 includes a map developer system 121, a mobile device 122, and a network 127. Additional, different, or fewer components may be provided. For example, many mobile devices 122 may connect with the network 127.

The developer system 121 includes a server 125 and a database 123. The developer system 121 may include computer systems and networks of a system operator such as NAVTEQ or Nokia Corporation. The geographic database 123 may be partially or completely stored in the mobile device 122.

The developer system 121 and the mobile device 122 are coupled with the network 127. The phrase "coupled with" is defined to mean directly connected to or indirectly connected through one or more intermediate components. Such intermediate components may include hardware and/or software-based components.

The database 123 includes geographic data used for mapping and navigation-related applications. The geographic data may include data representing a road network including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may be correlated to a three dimensional model representing a geographic area. The database 123 may also include, or be coupled with, the three dimensional model, as well as points of interest and the geographic locations of points of interest. These points of interest may be correlated to the three dimensional model using the geographic data. Examples of points of interest include gas stations, restaurants, lodging, entertainment and educational opportunities (such as amusement parks, water parks, movie theaters, night spots, museums, and libraries), and historical or other types of landmarks.

The mobile device 122 includes one or more detectors or sensors as a positioning system built or embedded into or within the interior of the mobile device 122. Alternatively, the mobile device 122 uses communications signals for position determination. The mobile device 122 receives location data from the positioning system. The server 125 may receive sensor data configured to describe a position of a mobile device, or a controller of the mobile device 122 may receive the sensor data from the positioning system of the mobile device 122.

The mobile device 122 may communicate orientation and location information via the network 127 to the server 125. The orientation and location information may also be associated with data captured at the location, such as a digital image. The digital image with associated orientation and location information may then be communicated to the server 125 via the network 127. The mobile device 122 may also communicate with the server 125 to transfer three dimensional model data between the mobile device 122 and the server 125.

The computing resources for determining, selecting, generating, and combining may be divided between the server 125 and the mobile device 122. In some embodiments, the server 125 performs a majority of the processing. In other embodiments, the mobile device 122 performs a majority of the processing. In addition, the processing is divided substantially evenly between the server 125 and the mobile device 122.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

Figure 3:
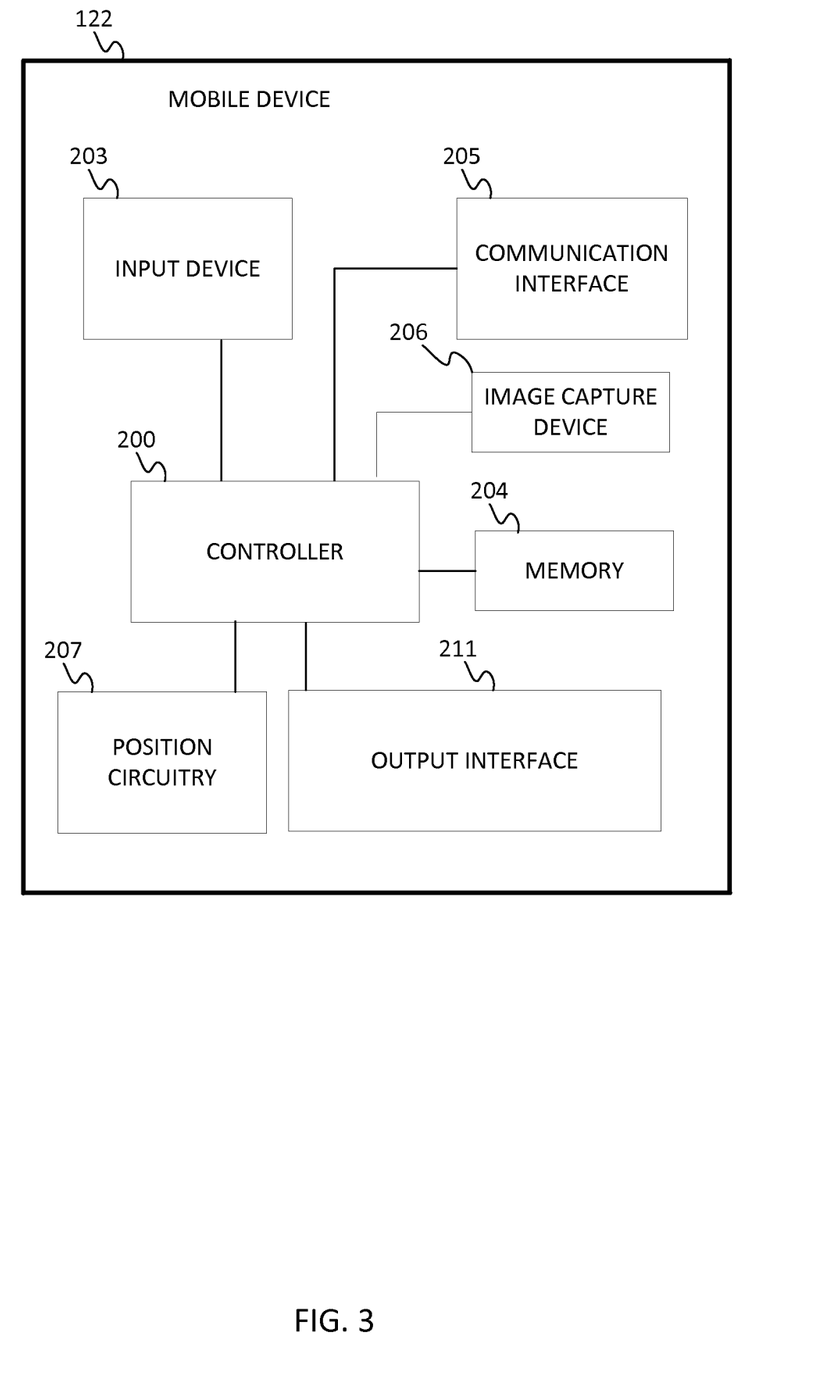
FIG. 3 illustrates an exemplary mobile device for image enhancement.

FIG. 3 illustrates an exemplary mobile device 122 for image enhancement. The mobile device 122 includes a controller 200, a memory 204, an input device 203, a communication interface 205, position circuitry 207, an image capture device 206, and an output interface 211. The output interface 211 may present visual or non-visual information such as audio information. The output interface 211 may be operational to display images and stereographic images. Additional, different, or fewer components are possible for the mobile device 122. The mobile device 122 is a smart phone, a mobile phone, a personal digital assistant (PDA), a tablet computer, a notebook computer, a personal navigation device (PND), a portable navigation device, a camera, and/or any other known or later developed mobile device. The positioning circuitry 207, which is an example of a positioning system, is configured to determine a geographic position of the mobile device 122.

The positioning circuitry 207 may include suitable sensing devices that measure the traveling distance, speed, direction, orientation, and so on, of the mobile device 122. The positioning system may also include a receiver and correlation chip to obtain a GPS signal. Alternatively or additionally, the one or more detectors or sensors may include accelerometers, gyroscopes, and/or magnetic sensors built or embedded into or within the interior of the mobile device 122. The accelerometer is operable to detect, recognize, or measure the rate of change of translational and/or rotational movement of the mobile device 122. The gyroscope is configured to generate data indicative of an angle of orientation of the mobile device 122, with regards to a reference plane or horizon reference for multiple angles of tilt related to the mobile device 122. The angle of orientation may be considered a multi-axis tilt measurement. The magnetic sensor, or a compass, is configured to generate data indicative of a heading, or cardinal direction bearing, of the mobile device 122. Data from the accelerometer, the gyroscope, and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

Location data may have spatial and temporal elements. For example, the controller 200 may associate a specific time that a position of the mobile device 122 was determined using the position circuitry 207. The controller 200 may also associate a time with any other action of the mobile device 122. This specific time may be associated with the determined position and saved as location data in memory 204, or transmitted to server 120. Location data with a temporal element may be considered time stamped. A time stamp may also be associated with other mobile device data such as image data, and other image associated data.

The input device 203 may be one or more buttons, keypad, keyboard, mouse, stylist pen, trackball, rocker switch, touch pad, voice recognition circuit, or other device or component for inputting data to the mobile device 122. The input device 203 and the output interface 211 may be combined as a touch screen, which may be capacitive or resistive. The output interface 211 may be a liquid crystal display (LCD) panel, light emitting diode (LED) screen, thin film transistor screen, or another type of display. The output interface 211 may also include audio capabilities, or speakers.

The controller 200 may include a general processor, digital signal processor, an application specific integrated circuit (ASIC), field programmable gate array (FPGA), analog circuit, digital circuit, combinations thereof, or other now known or later developed processor. The controller 200 and may be a single device or combinations of devices, such as associated with a network, distributed processing, or cloud computing.

The memory 204 may be a volatile memory or a non-volatile memory. The memory 204 may include one or more of a read only memory (ROM), random access memory (RAM), a flash memory, an electronic erasable program read only memory (EEPROM), or other type of memory. The memory 204 and may be removable from the mobile device 100, such as a secure digital (SD) memory card.

The communication interface 205 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

In an embodiment, the memory 204 is configured to store a mobile image having location data and orientation data. The memory 204 may also be configured to store a three dimensional model of a geographic area represented by the mobile image. The controller 200 may be configured to determine an estimated pose related to the mobile image within the three dimensional model using the location data and orientation data. The controller 200 may also be configured to select an alternate pose within the three dimensional model based on the estimated pose. The controller 200 may be further configured to generate a virtual image of the three dimensional model as a function of the alternate pose and combine the mobile image and the virtual image to create a stereo image.

In an embodiment, the communication interface 205 may be configured to download an entire three dimensional model, or just a portion of the three dimensional model corresponding to a geographic area captured by the mobile image. The communication interface 205 may also be configured to download the image, upload the image, or download an aligned image and three dimensional model.

In an embodiment, the mobile device 122 also includes an image capture device 206. The image capture device 206 may be any device operable to record or create durable images by recording light or other electromagnetic radiation. The image capture device 206 may function chemically by means of light-sensitive material such as photographic film, electronically by using an image sensor (e.g., a charge coupled device) or by any other available mechanism for capturing a physical view of objects and the environment the objects are in. Images captured by the image capture device 206 may be considered mobile images. Images captured by the image capture device 206 may also be considered casually acquired images. The image capture device 206 may have a digital or optical zoom capability. The level of zoom may be associated with an image by the controller 200. The image capture device 206 may be a camera.

In an embodiment, the image capture device 206 captures an image, the controller 200 saves the image digitally with associated image location and orientation information, determined from the position circuitry 207, in the memory 204. The image orientation information may include view direction data or tilt angle data. The image may also be displayed on the output device 211, and communicated to other mobile devices 122, the network 125, or any other device to be stored or displayed, using the communication interface 205.

Figure 4:
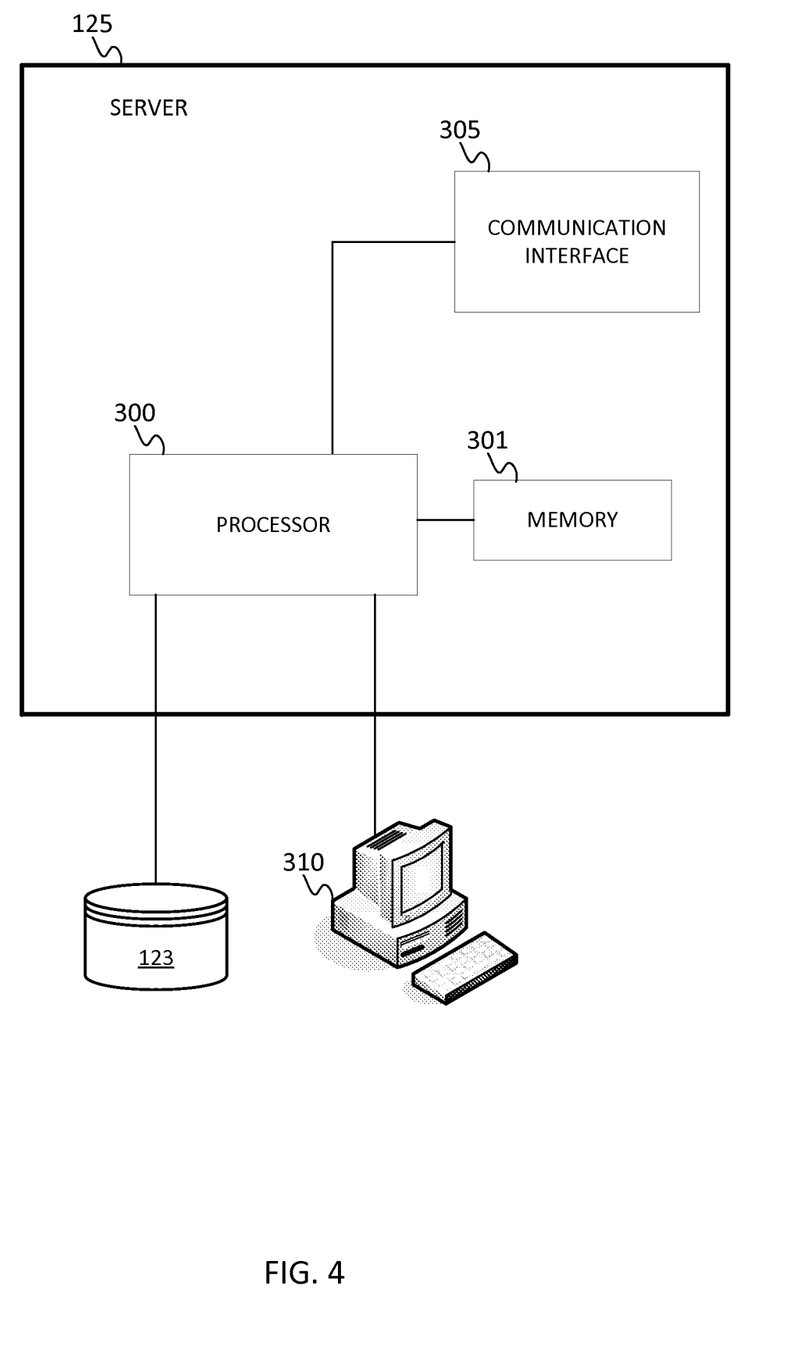
FIG. 4 illustrates an exemplary server for image enhancement.

FIG. 4 illustrates an exemplary server 125 for image enhancement. The server 125 includes a processor 300, a communication interface 305, and a memory 301. The server 125 may be coupled to a database 123 and a workstation 310. The database 123 may be a geographic database. The workstation 310 may be used as an input device for the server 125. In addition, the communication interface 305 is an input device for the server 125. The communication interface 305 receives data from the mobile device 122 and sends data to the mobile device 122.

The processor 300 may include a general processor, digital signal processor, an application specific integrated circuit (ASIC), field programmable gate array (FPGA), analog circuit, digital circuit, combinations thereof, or other now known or later developed processor. The processor 300 may be a single device or combinations of devices, such as associated with a network, distributed processing, or cloud computing.

The memory 301 may be a volatile memory or a non-volatile memory. The memory 301 may include one or more of a read only memory (ROM), random access memory (RAM), a flash memory, an electronic erasable program read only memory (EEPROM), or other type of memory.

The communication interface 305 may include any operable connection. An operable connection may be one in which signals, physical communications, and/or logical communications may be sent and/or received. An operable connection may include a physical interface, an electrical interface, and/or a data interface. The communication interface 305 provides for wireless and/or wired communications in any now known or later developed format.

In an embodiment, the memory 301 is configured to store a mobile image having location data and orientation data. The memory 301 is also configured to store a three dimensional model of a geographic area represented by the mobile image. A processor 300 may be configured to determine an estimated pose related to the mobile image within the three dimensional model using the location and orientation data. The processor 300 may also be configured to select an alternate pose within the three dimensional model based on the estimated pose. Further, the processor 300 may be configured to generate a virtual image of the three dimensional model as a function of the alternate pose and combine the mobile image and the virtual image to create a stereoscopic image.

The communication interface 305 is configured to receive an image that captures a view of a geographic area. The communication interface 305 may also be configured to communicate a model of a geographic area to a mobile device 122. The communication interface 305 may also be configured to communicate an image aligned with a model to a mobile device, along with any information associated with the model.

The workstation 310 may contain a display to display a model, and image or a combined stereoscopic image created from the combination of model data and image data.

In an embodiment, the model is supplemented by the geographic database 123 to associate points of interest from the geographic database 123 with specific locations of the model. The geographic database 123 and the model may be aligned using a common coordinate system. This coordinate system may also be aligned with a corresponding real-world geographic coordinate system.

Figure 5:
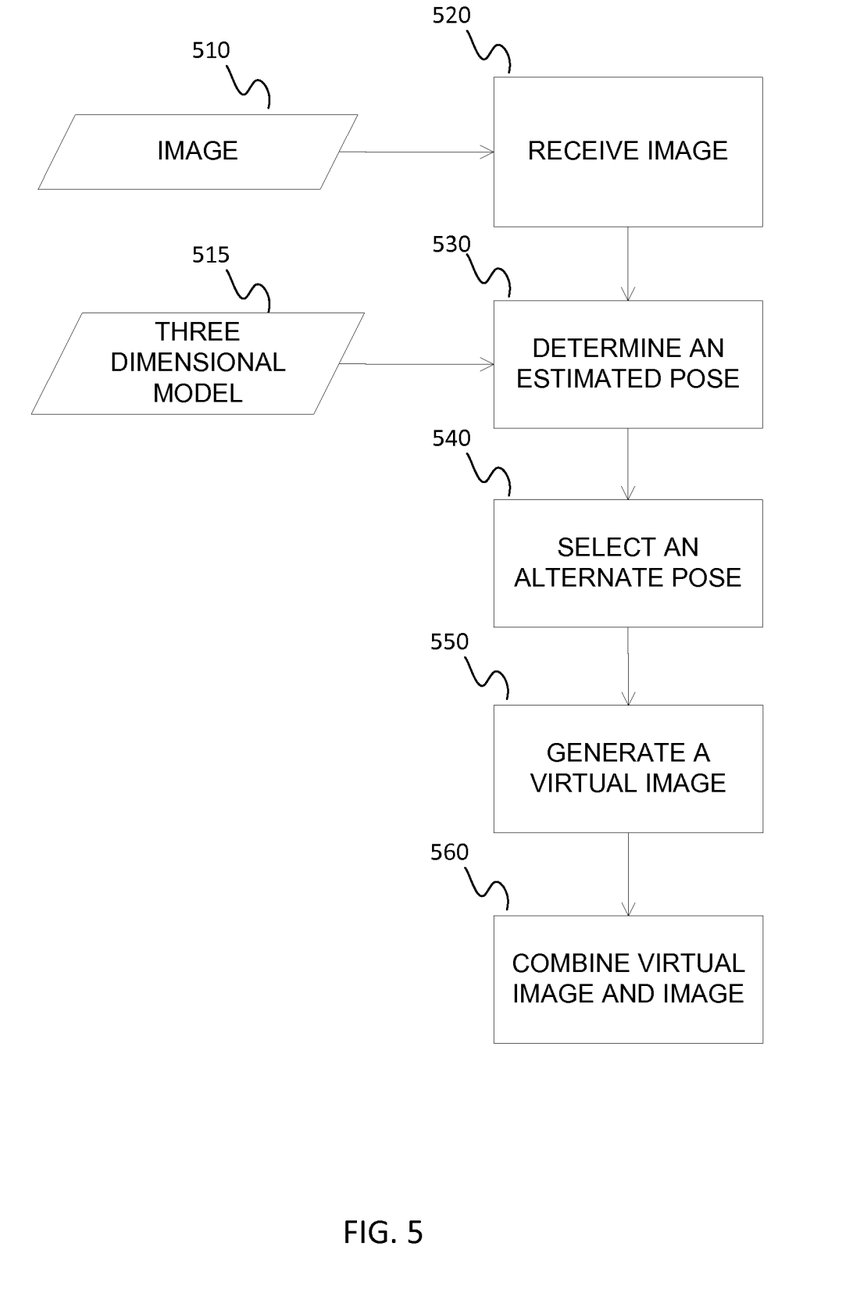
FIG. 5 illustrates an example flowchart for image enhancement.

FIG. 5 illustrates an example flowchart for image enhancement. As presented in the following sections, the term controller may refer to either controller 200 or processor 300 and the following acts may be performed by mobile device 122, server 125, or a combination thereof. Additional, different, or fewer acts may be provided. Mobile data may refer to, image data, location information sent from a mobile unit, other location based data, or other data sent from a mobile unit. The acts are performed in the order shown or other orders. The acts may also be repeated.

At act 520 an image 510 is received. The image 510 may be a representation of a physical view of a geographic area. The image 510 may be a mobile image file comprising image data of a geographic region and other image associated information. Image data may include a visible representation of the geographic region.

Image associated information may include geographic data indicating the location of the device that captured the image 510, when the image was captured. As such, this capture location may be indicated through geographical identification metadata, or geotagging data, associated with the image 510. This geotagging data may be in any form. For example, the capture location may be represented as GPS coordinates, or in other formats indicating a latitudinal and longitudinal location. Image associated information may also include orientation information recorded at the time the image 510 was captured, such as angle of tilt of the image capturing device, or the direction the image capturing device was facing at the time the image 510 is captured. Image associated information may also include zoom level of the image capturing device, time and date of capture, or any other information recordable at the time the image 510 is captured. Image associated data may be stored as metadata, as an associated file separate from the image data, or in any other manner that associates information with the image data.

The mobile image 510 may be received from a camera, or other image generating device. The image 510 may also be received from a network, or other device.

At act 530 an estimated pose within the three dimensional model 515 related to the mobile image 510 is determined using orientation data associated with the mobile image 515. The estimated pose may represent a location and orientation within the three dimensional model 515 that would present a view of the three dimensional model 515 that mimics the view represented in the mobile image 510. The estimated pose of the mobile image 510 within the three dimensional model 515 may be determined using any known method. The estimated pose of the mobile image 510 within the three dimensional model 515 may be determined manually or automatically. In one embodiment, image associated orientation and location information is used for alignment. The image associated orientation and location information may allow for the identification of a point in the three dimensional model that represents the location that the image capture device that captured image 510 was located, when image 510 was captured. The image associated orientation information also may include information indicating what direction the capture device was facing, and at what angle relative to the horizon the capture device was tilted. This information may be used to mimic the precise pose of the capture device when the mobile image was captured.

At act 540 an alternate pose within the three dimensional model 515 is selected based on the estimated pose. The three dimensional model 515 may include any representation of a three dimensional surface of an object or a geographic area. The three dimensional model 515 may be oriented to provide two dimensional views of the model. These views may resemble actual images of the object or geographic area. These views may also use actual images of the geographic area the model represents to cover the surfaces of the three dimensional model. Using actual images of geographic features and geographical areas can create a very realistic three dimensional model. The three dimensional model 515 may also use artificial coloring schemes to cover surfaces to represent the geographic area. These artificial coloring schemes may involve sampling colors from the mobile image 510, and using the sampled colors for associated features in the three dimensional model 515. The three dimensional model 515 may be a solid model, or a shell model. The three dimensional model 515 may be created using polygonal modeling, curve modeling, digital sculpting, or any other method of creating a three dimensional model. The three dimensional model 515 may also represent points of interest in the geographical areas that are represented by the three dimensional model 515.

The alternate pose may be offset from the determined estimated pose. The offset may be in any direction, thus establishing a stereoscopic base line between the alternate pose and the estimated pose. In an embodiment, the offset is a distance represented in the model as a distance separating the eyes of a user viewing the model, or images generated using the model. The offset may also be adjusted to a larger or smaller distance to manipulate a stereoscopic effect of an assembled stereoscopic image. The offset may also be in a horizontal plane, so as to maintain a level, but offset perspective of the model between the alternate pose and the estimated pose.

At act 550 a virtual image of the three dimensional model 515 is generated as a function of the alternate pose. In an embodiment, the virtual image is a view of the three dimensional model 515 from the alternate pose, with a boundary established to correlate with the boundaries of the geographic area presented in the mobile image 510, as represented in the three dimensional model 515. The boundary of the alternate pose may be determined using a zoom level recorded in image associated information. The boundary may also be determined by matching pixels or coordinates between the three dimensional model's 515 two dimensional view and the image 510. The boundary may also be determined using a measurement of objects in the image 510 compared to the three dimensional model 515 to determine a perspective or distance from the objects in the image 510.

In an embodiment, the virtual image of the three dimensional model 515 is generated using the mobile image 510 for the creation of a mask for the three dimensional model 515. Points in the mobile image 510 may be identified that correlate with points in the three dimensional model 515 such that the mobile image 510 is used to cover the viewable surface of the three dimensional model 515. The colors and lighting of the mobile image 515 may be sampled and mimicked to extend the mask to areas of the three dimensional model 515 that are not displayed in the mobile image 510.

At act 560, the mobile image 510 and the virtual image are combined to create a stereoscopic image. The mobile image 510 and the virtual image may be combined by any method or technique used to create a stereoscopic image. For example, the mobile image 510 and the virtual image may be interleaved to form an image that when viewed provides the perception of three dimensional depth. A stereoscopic image may be created for any stereoscopic viewing technique, including freeviewing, autostereogram, virtual retinal displays, autostereoscopy, wiggle stereographic, or any other stereoscopic viewing or construction technique.

Image information including date and time may also be correlated to seasonal or daylight characteristic data to indicate how images derived from the three dimensional model 515 may be generated. For example, if the image information indicates that the mobile image 510 was captured during the winter, the virtual image generated from the three dimensional model 515 may be a view presented with snow covering all or parts of the point of interest. Similarly, if the image data indicates that the image 510 was captured at night, the virtual image may be presented with appropriate night lighting characteristics.

Figure 6:
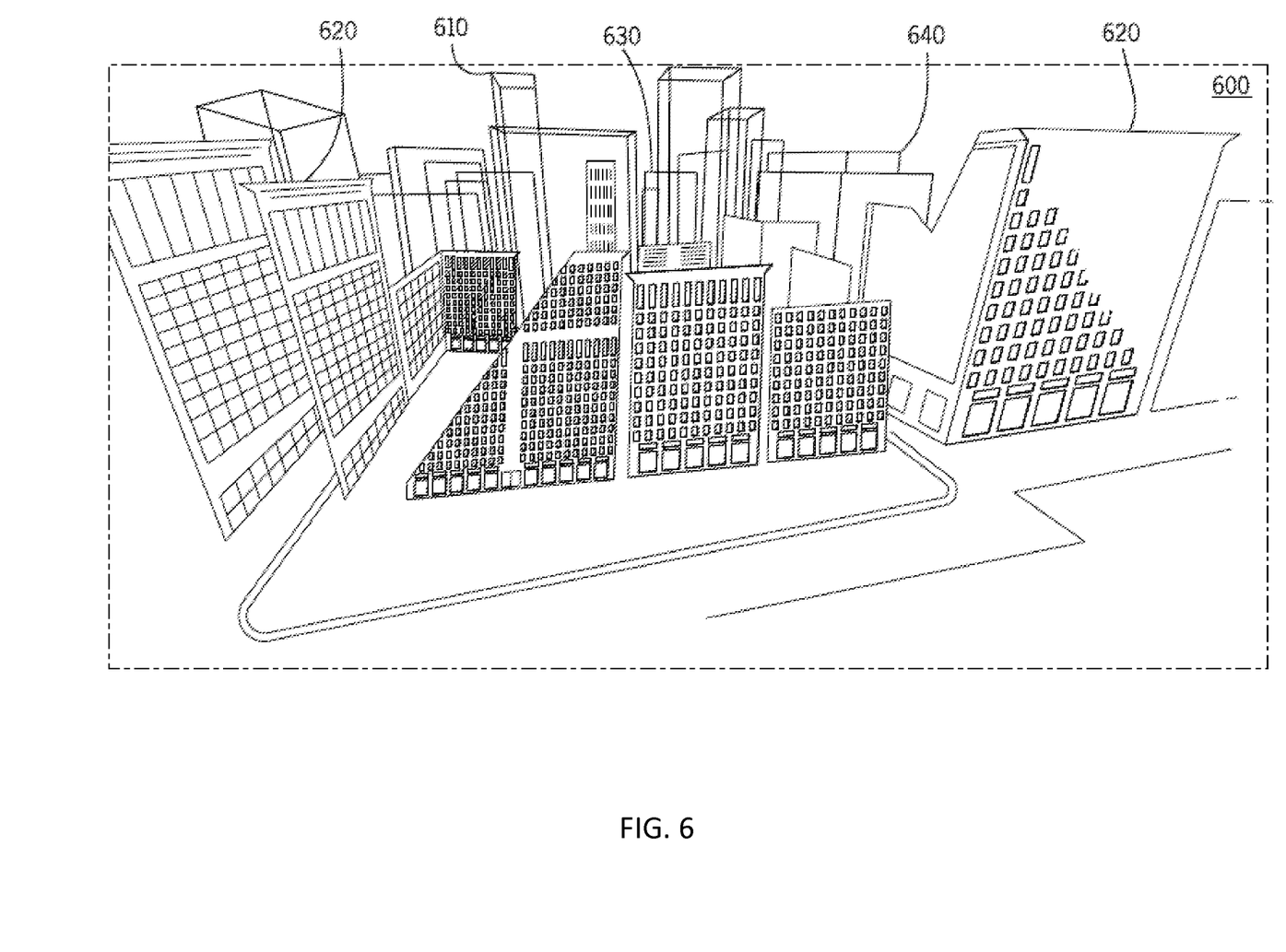
FIG. 6 is an example image representing a view of a model of a geographic area.

FIG. 6 is an image representing a view of a three dimensional model 600 of a geographic area. The three dimensional model 600 has been partially deconstructed in this view to display the elements and assembly of the three dimensional model 600. The three dimensional model 600 is composed of wire-form models 610 of buildings, structures, and other objects included in the geographic area. The wire-form models 610 include polygon structures 630 and corner points 640. The polygon structures 630 may be fitted with masks 620 of the real world structure the polygon structures 630 represent. The masks 620 may be actual image captures of the represented structure, computer generated texture maps, or other surface covering image effects. Texture maps may be computer generated imitations of sampled colors from mobile or casually captured images.

The three dimensional model 600 may be rotated, translated, and otherwise manipulated to mimic almost any real world view of the geographic area represented, from any perspective or vantage point. The masks 620 may be fitted to all sides of the polygon structures 630 such that as the three dimensional model 600 is rotated, translated, or otherwise manipulated, the masks 620 maintain full visible coverage of the polygon structures 630. The masks 620 therefore enable the three dimensional model 600 to be oriented in any perspective to mimic specific views based on captured images of a geographic area. Two dimensional images of the three dimensional model 600 can be generated from the mimicked views. Portions of the three dimensional model 600 may also be partitioned to allow isolated viewing of specific buildings or points of interest, without the visual impediment provided by adjacent or proximate polygon structures 630 or other model portions.

Figure 7:
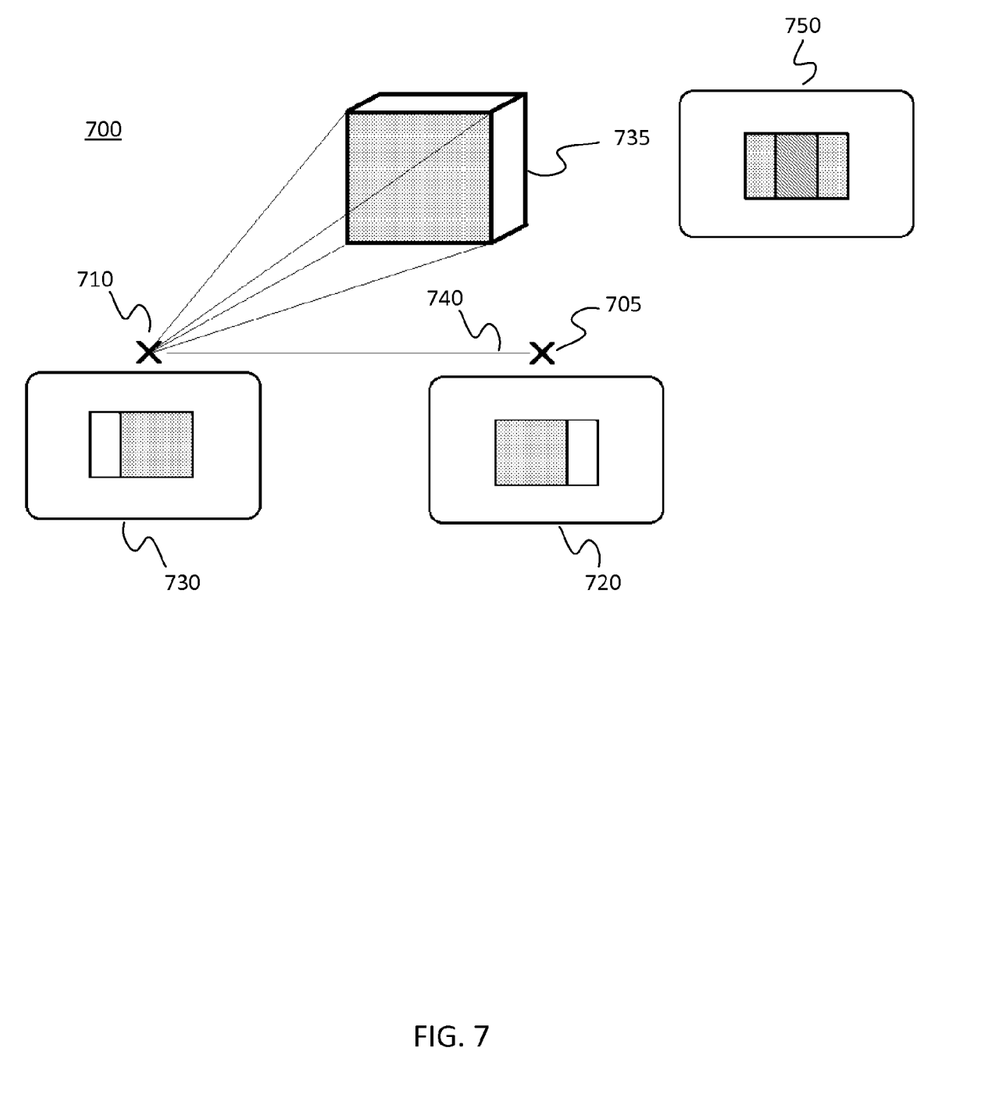
FIG. 7 is a representation of image enhancement using a three dimensional model.

FIG. 7 is a representation of image enhancement using a three dimensional model 700. A pose 705 is estimated in the three dimensional model 700 of an image 720. The image 720 may be a capture of a real world object in a geographic area represented in the three dimensional model 700 as a model object 735.

The image 720 may be a casually acquired image, and may therefore typically have an indeterminate orientation with respect to the captured view of the geographic area the image 720 represents. Measuring characteristics of a capture device used to capture the image 720 may allow a pose of the capture device to be approximated, and this approximation may be translated into an estimation of the pose within a three dimensional model 700 that may provide a similar view as the casually acquired image 720 within the three dimensional model 700. The measured characteristics of the capture device may be associated or stored with the casually acquired image 720 as image information. The pose 705 may be estimated using the image information associated with the casually acquired image 720 when the casually acquired image 720 was captured. This information may include measurements of tilt angles of an image capture device in multiple tilt orientations and directions. The associated information may also include geographic location information, facing direction information, zoom level, and any other information related to the capture device when the casually acquired image 720 was captured.

A virtual image 730 of the object 735 in the three dimensional model 700 may be generated by selecting an alternate pose 710 to the estimated pose 705. The alternate pose 710 may be offset from the estimated pose 705 by a distance in the model 740. The alternate pose may use information associated with the image 720 to mimic the elements of the estimated pose, such as tilt angle, facing direction, or zoom level to create a similar, but offset, perspective of the object 735 in the three dimensional model 700 from the perspective of the real world object displayed in the image 720.

The image 720 and the virtual image 730 may be combined to form a stereoscopic image 750 that represents the real world object displayed in the image 720 as a three dimensional representation of that object, enhanced from the two dimensional representation of the image 720.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method comprising:
   receiving a mobile image file comprising image data of a geographic area, location data and orientation data describing a location and an orientation of a mobile device at a time the image data was captured;
   aligning the image data with a three dimensional model based on the location data and the orientation data;
   determining an estimated pose within the three dimensional model related to the mobile image file using the location data and the orientation data;
   selecting an alternate pose within the three dimensional model based on the estimated pose;

generating a virtual image of the three dimensional model as a function of the alternate pose, wherein generating the virtual image further comprises correlating a boundary of the geographic area by matching coordinates between the three dimensional model and the image data; and combining the image data and the virtual image to create a stereoscopic image, wherein the stereoscopic image provides a view of the geographic area with a three dimensional effect.

2. The method of claim 1, wherein the receiving comprises receiving the mobile image file from a mobile application on a mobile device.

3. The method of claim 1, wherein the orientation data is measured by at least one of a magnetic sensor and an accelerometer associated with the mobile device.

4. The method of claim 1, wherein the orientation data comprises at least one of view direction data or tilt angle data.

5. The method of claim 1, wherein the mobile image file also includes zoom level data describing the level of zoom used to capture the image data.

6. The method of claim 1, wherein selecting an alternate pose comprises determining an alternate pose that is separated horizontally from the estimated pose by a typical distance within the three dimensional model, and wherein a geographic representation in the three dimensional model displayed by the alternate pose represents the geographic area of the mobile image file.

7. The method of claim 6, wherein the typical distance represents a distance separating two eyes of a user.

8. The method of claim 1, wherein the three dimensional model is configured to mimic an appearance of geographic areas at different times of day and different times of year.

9. The method of claim 8, wherein the mobile image file further comprises a time of day or time of year the casually acquired image was captured, and the generating the virtual image comprises generating an image of the three dimensional model to mimic a time of day or a time of year of the orientation data.

10. The method of claim 1, wherein the virtual image is generated using the mobile image file as a mask for the three dimensional model.

11. An apparatus comprising:
a memory configured to store:
a mobile image file comprising image data, orientation data, and location data; and
a three dimensional model of a geographic area represented by the mobile image data; and
a controller configured to:
align the image data with the three dimensional model based on the location data and the orientation data,
determine an estimated pose related to the mobile image file within the three dimensional model using the orientation data and the location data,
select an alternate pose within the three dimensional model based on the estimated pose,
generate a virtual image of the three dimensional model as a function of the alternate pose, wherein generating the virtual image further comprises correlating a boundary of the geographic area by matching coordinates between the three dimensional model and the image data, and combine the mobile image file and the virtual image to create a stereo image.

12. The apparatus of claim 11, further comprising an image sensor configured to capture the mobile image file from a physical view of the geographic area.

13. The apparatus of claim 11, further comprising position circuitry configured to record the orientation data and the location data, and wherein the controller is further configured to associate the orientation data and the location data with the mobile image.

14. The apparatus of claim 13, wherein the orientation data comprises at least one of view direction data or tilt angle data.

15. The apparatus of claim 11, wherein the controller is configured to receive at least a portion of the three dimensional model representing the geographic area.

16. The apparatus of claim 11, wherein the three dimensional model is configured to mimic an appearance of the geographic area at different times of day or different times of year.

17. The apparatus of claim 16, wherein the mobile image file further comprises a time of day or time of year the mobile image was captured, and the generated virtual image comprises an image of the three dimensional model presented to mimic a time of day or a time of year of the orientation data.

18. A non-transitory computer readable medium including instructions that when executed on a computer are operable to:
determine an estimated pose within a geographic model related to an image, wherein the image has associated orientation data and position data;
determine an estimated pose based on the orientation data and the position data;
select an alternate pose within the geographic model based on the estimated pose;
generate a virtual image of the geographic model as a function of the alternate pose wherein the virtual image is generated by correlating a boundary of the geographic model by matching coordinates with the image; and
combine the image and the virtual image to create a stereoscopic image.

19. The computer readable medium of claim 18, wherein the instructions are further operable to:
capture the image, and wherein the computer readable medium is a memory of a mobile device.

20. The computer readable medium of claim 19, wherein the orientation data and the position data is measured by the mobile device.

* * * * *